United States Patent
Lection et al.

(10) Patent No.: US 7,181,489 B2
(45) Date of Patent: Feb. 20, 2007

(54) METHOD, APPARATUS, AND PROGRAM FOR DISTRIBUTING A DOCUMENT OBJECT MODEL IN A WEB SERVER CLUSTER

(75) Inventors: David B. Lection, Raleigh, NC (US); Eric L. Masselle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 10/043,439

(22) Filed: Jan. 10, 2002

(65) Prior Publication Data

US 2003/0131051 A1    Jul. 10, 2003

(51) Int. Cl.
    *G06F 15/16*    (2006.01)
(52) U.S. Cl. ..................... 709/202; 709/205
(58) Field of Classification Search ........ 709/201–207, 709/217–226, 238, 213–216, 230; 719/313–315; 718/100; 707/103 R, 103 X–103 Z
    See application file for complete search history.

(56) References Cited

U.S. PATENT DOCUMENTS

| | | | | |
|---|---|---|---|---|
| 5,339,427 A * | 8/1994 | Elko et al. ................. | 718/103 |
| 5,561,797 A * | 10/1996 | Gilles et al. .................... | 707/8 |
| 5,613,134 A | 3/1997 | Lucus et al. ................ | 395/788 |
| 5,761,507 A * | 6/1998 | Govett ........................ | 718/101 |
| 5,845,067 A | 12/1998 | Porter et al. ................. | 395/186 |
| 5,961,651 A * | 10/1999 | Gittins et al. ................. | 714/5 |
| 5,999,964 A * | 12/1999 | Murakata et al. ............ | 709/201 |
| 6,012,094 A * | 1/2000 | Leymann et al. ............ | 709/230 |
| 6,023,722 A * | 2/2000 | Colyer ........................ | 709/201 |
| 6,073,163 A | 6/2000 | Clark et al. .................. | 709/203 |
| 6,108,687 A | 8/2000 | Craig ........................... | 709/203 |
| 6,279,001 B1 * | 8/2001 | DeBettencourt et al. ...... | 707/10 |
| 6,408,163 B1 * | 6/2002 | Fik ............................. | 455/3.01 |
| 6,449,646 B1 * | 9/2002 | Sikora et al. ................ | 709/226 |
| 6,449,734 B1 * | 9/2002 | Shrivastava et al. .......... | 714/15 |
| 6,687,878 B1 * | 2/2004 | Eintracht et al. ............ | 715/512 |
| 6,732,139 B1 * | 5/2004 | Dillenberger et al. ........ | 718/102 |
| 6,785,678 B2 * | 8/2004 | Price .............................. | 707/8 |
| 6,807,580 B2 * | 10/2004 | Freeman et al. ............ | 709/249 |
| 6,842,763 B2 * | 1/2005 | Kettley et al. ............... | 707/200 |

(Continued)

FOREIGN PATENT DOCUMENTS

WO    WO 00/56055    9/2000

OTHER PUBLICATIONS

Kermarrec et al.; Towards Scalable Web Documents; 1998.*

(Continued)

*Primary Examiner*—Krisna Lim
*Assistant Examiner*—Sean Reilly
(74) *Attorney, Agent, or Firm*—Stevens & Showalter (57) ABSTRACT

An asynchronous, peer-to-peer design is provided for synchronizing data on machines within a cluster using messaging. The data may be represented in memory as a document object model in secondary storage. Messaging may be handled by a messaging system with topic destinations. The design supports persistence management, locking, and transactions with rollback, and maintains a uniform state for the data across all nodes and secondary storage at all times. Furthermore, barring catastrophic failure of all machines in the cluster and secondary storage, there is no possibility of losing committed data.

27 Claims, 7 Drawing Sheets

U.S. PATENT DOCUMENTS

| | | | |
|---|---|---|---|
| 6,877,107 B2* | 4/2005 | Giotta et al. | 714/4 |
| 6,963,882 B1* | 11/2005 | Elko et al. | 707/200 |
| 2002/0069157 A1* | 6/2002 | Jordan | 705/37 |
| 2002/0120717 A1* | 8/2002 | Giotta | 709/219 |
| 2002/0129052 A1* | 9/2002 | Glazer et al. | 707/501.1 |
| 2002/0138582 A1* | 9/2002 | Chandra et al. | 709/206 |
| 2003/0065775 A1* | 4/2003 | Aggarwal et al. | 709/225 |

OTHER PUBLICATIONS

Kreger; Web Services Conceptual Architecture; May 2001.*
Laitinen; XML Messaging; 2000.*
Talarian Coporation; Everything you Need to Know About JMS; 2001.*
BEA, Using Weblogic JMS, Dec. 2001.*
BEA, Developing a WebLogic JMS Application, Aug. 2001.*
IBM Research Disclosure 432174, "A Process for the Blending of Web Content", Apr. 2000, pp. 778-779.
Kermarrec, et al., "A Framework for Consistent, Replicated Web Objects", 18th International Conference on Distributed Computing Systems, Los Alamitos, CA, USA, 1998, pp. 276-284.
Bisson, "Getting Wise with Web Development", Object Magazine, Jun. 1998, pp. 50-53.

* cited by examiner

METHOD, APPARATUS, AND PROGRAM FOR DISTRIBUTING A DOCUMENT OBJECT MODEL IN A WEB SERVER CLUSTER

BACKGROUND OF THE INVENTION

1. Technical Field

The present invention relates to distributed data processing and, in particular, to peer-to-peer data sharing and synchronization in a distributed data processing system.

2. Description of Related Art

Application Servers are software that is designed to serve multiple applications for multiple users that work on related tasks. Application Servers are an evolving concept that is more than just multiuser software which allows access to the same data. Application servers provide a mechanisms that help servers coordinate application and user data, and track on-going projects.

The heart of an application server is a system for maintaining state of applications and data between the physical servers that make up the application server cluster of machines. Typically this system is a messaging system. As state changes on one machine in the cluster, the machine sends a message to all other machines with a notification of the state change, and data representing the new value of the state.

Application groupware is one example of applications that are supported by application servers. Groupware applications allow users to collaborate on related work tasks and share data among the users involved in the tasks. Typically messages are used to notify team members, obtain responses and send alerts. Other applications include document sharing and document management, group calendaring and scheduling, group contact and task management, threaded discussions, text chat, data conferencing and audio and videoconferencing. Workflow, which allows messages and documents to be routed to the appropriate users, is often part of a groupware system.

The use of the Internet and intranets has grown, because of the ease with which documents can be created and shared. However, as documents become widely used and distributed throughout an enterprise, security and synchronization problems surface. Document management, access control, and replication become issues. Thus, what starts out as a simple way to electronically publish information winds up presenting a new set of problems.

Therefore, it would be advantageous to provide an improved mechanism for clustering application servers and the data and documents shared in the application server cluster.

SUMMARY OF THE INVENTION

The present invention provides an asynchronous, peer-to-peer design for synchronizing data on machines within a cluster using messaging. In a preferred embodiment, the data is represented in active memory as a document object model; however, representation in secondary storage may or may not take the form of a DOM. Messaging may be handled by a messaging system with topic destinations. The present invention supports persistence management, locking, and transactions with rollback, and maintains a uniform state for committed data across all nodes and secondary storage at all times. Furthermore, barring catastrophic failure of all machines in the cluster and secondary storage, there is no possibility of losing committed data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
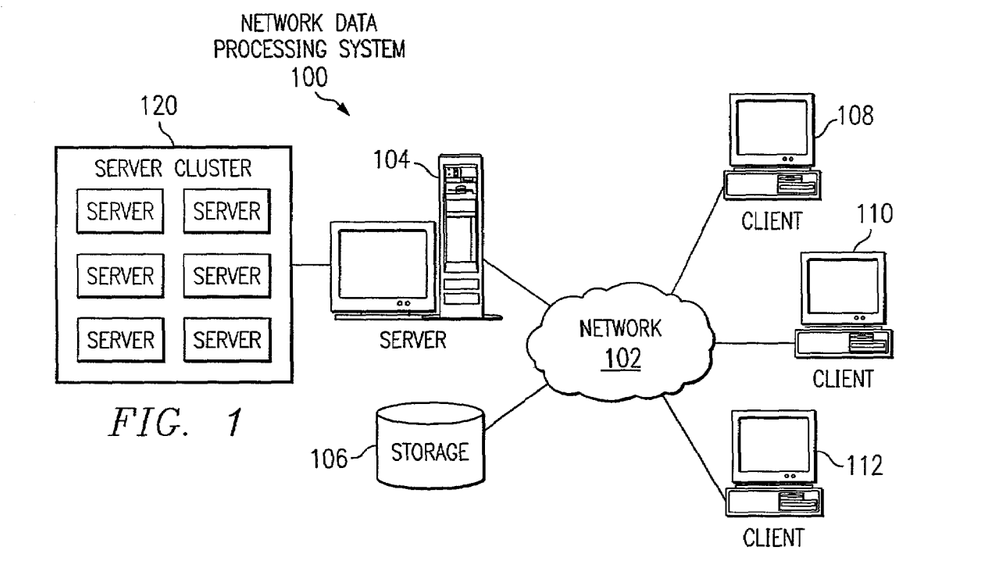
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data to clients 108–112. Clients 108, 110, and 112 are clients to server 104. Network data processing system 100 may include additional servers, clients, and other devices not shown.

In particular, network data processing system 100 may include server cluster 120. A cluster of computer systems provides fault tolerance and/or load balancing. If one system fails, one or more additional systems are still available. Load balancing distributes the workload over multiple servers. Server 104 may be part of server cluster 120 or may process requests for the server cluster. As such, the server cluster may appear to clients 108, 100, 112 as a single machine, i.e. having a single Internet Protocol (IP) address.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
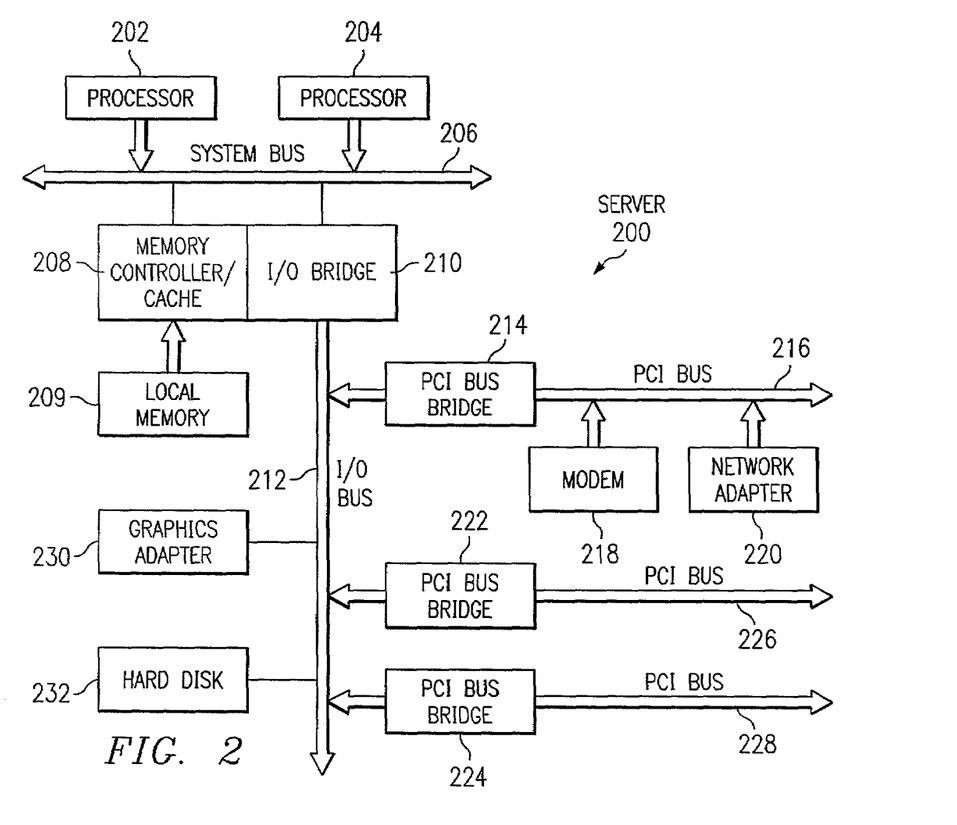
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections 15 to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pseries system, a product of International Business Machines Corporation in Armonk, N.Y., running the Advanced Interactive Executive (AIX) operating system or LINUX operating system.

Figure 3:
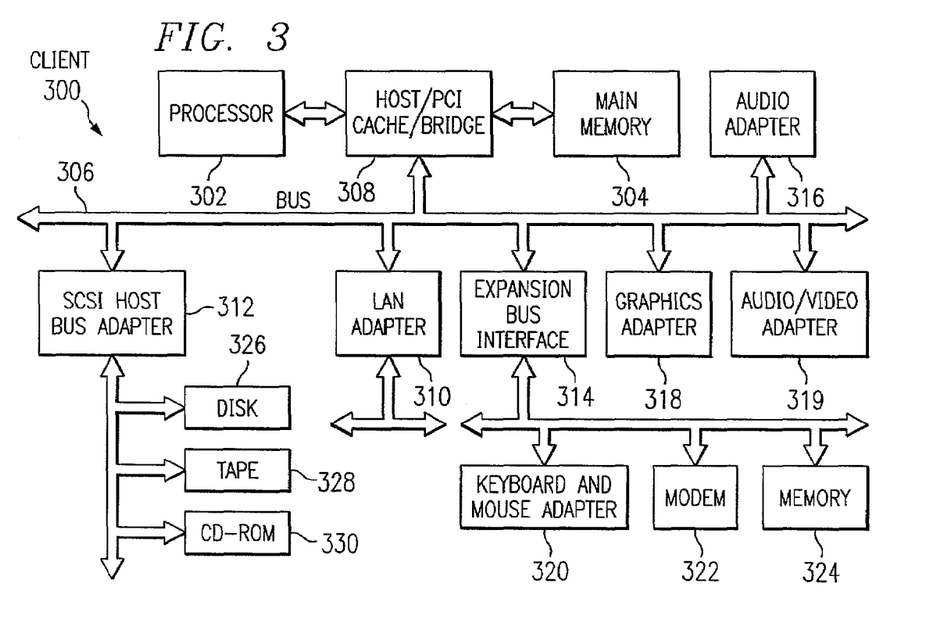
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Returning to FIG. 1, server 104 may support a messaging system, such as Java Messaging Service. A messaging system is software that provides a message delivery system. The messaging system stores messages in a message store, such as database 106, until they are consumed by subscribers. Messages are sorted and stored by topic and each of the servers in server cluster 120 subscribes to each of the topics. Each of the servers in the server cluster is a node, referred to as a Cnode. A cluster contains many server machines, and these machines operating in tandem give the view of a single server. This permits servicing of many more clients. The present invention addresses the problem of trying to keep the data identical on all the separate server machines in the cluster—even when the data is changing—so that identical requests from clients to any machine will be identical.

The present invention also allows changes to be made from a single session, using locks, across several requests and allows the requesting computer to see the changing, but still uncommitted, data while all others still see the committed data. In accordance with a preferred embodiment of the present invention, data is represented in memory as a document object model (DOM). A DOM is represented as a tree structure. Nodes in a DOM tree are referred to herein as Dnodes.

With reference now to FIGS. 4A–4D, block diagrams depict data flow between a cluster node and a messaging service in accordance with a preferred embodiment of the present invention. Cnode 402 includes edit thread 404, transaction thread 406, user thread 408, result thread 410, and consumption thread 420. Messaging service 412 includes edit topic 414, result topic 416, and transaction topic 418. A session is created when a client makes a request to a server in the cluster. A session is identified by a session ID. When a request is received, the Cnode creates a message, or "work item," that is published to a topic. A work item message may contain a filter value, a brand, the task to be performed, and a session identification (ID) identifying the session making the request. The publisher of the work item message is referred to as the originating Cnode.

Cnode 402 includes consumption thread 420, which consumes work item messages from topics and passes them to the appropriate thread. All Cnodes are publishers to, and consumers of, work item messages from the edit topic 414 and the transaction topic 418. The edit topic requires no filtering. Work item messages in the edit topic are consumed by all Cnodes. The transaction topic employs filters. Work item messages in the transaction topic are consumed only by the Cnode with an ID matching the filter value.

Events that modify or lock an unlocked Dnode are published to edit topic 414. Work item messages published to the edit topic are "branded" with the ID of the publishing (originating) Cnode. Events that modify or unlock a locked Dnode are published to transaction topic 418. Work item messages published to the transaction topic have a filter value of the ID of the locking Cnode, the Cnode that originally received the request to lock a given Dnode. Thus, only the Cnode that locked a Dnode may modify or unlock that Dnode.

All Cnodes are publishers to result topic 416. The result topic employs filters, but the filter may be the ID of the locking Cnode or it may be 'all', indicating that all Cnodes will consume the result item. In other words, result items may be consumed by all Cnodes or only the locking Cnode. All Cnodes are consumers of the Result topic. Result items are published to the result topic. Result items contain either a response from a task, the resulting modification from the task, or both. In accordance with a preferred embodiment of the present invention, the data is represented by a DOM and the resulting modification comprises a data stream representing a Dnode or subtree. A result item also contains a reference to the user thread from the originating Cnode. A result item is labeled with one of five "task types": Edit, Lock, Unlock, Transaction, and Response. A result item also has a "Success" flag that indicates whether the task was successful or not. Unsuccessful result items do not contain a result.

Cnodes maintain edit queue 405 of work item messages received from edit topic 414. Cnodes also maintain transaction buffer 407 of modified Dnodes associated with a locked subtree. Only the locking Cnode, the Cnode that originally received the lock request, maintains the modified Dnodes in transaction buffer 407. When a DOM subtree is locked, the locking Cnode makes a copy of the locked subtree; it is this copy that is maintained and modified in the transaction buffer. The nodes in a locked subtree are herein referred to collectively as a lock domain.

Modifications resulting from work item messages published in the edit topic are propagated upon completion. Modifications resulting from work item messages published in the transaction topic exist only in the modified Dnodes in the transaction buffer of the locking Cnode. All modifications for a locked subtree are propagated as a unit once the transaction has been committed, such as by unlocking the Dnode. Modifications are propagated by publishing the modifications to result topic 416.

Figure 4A:
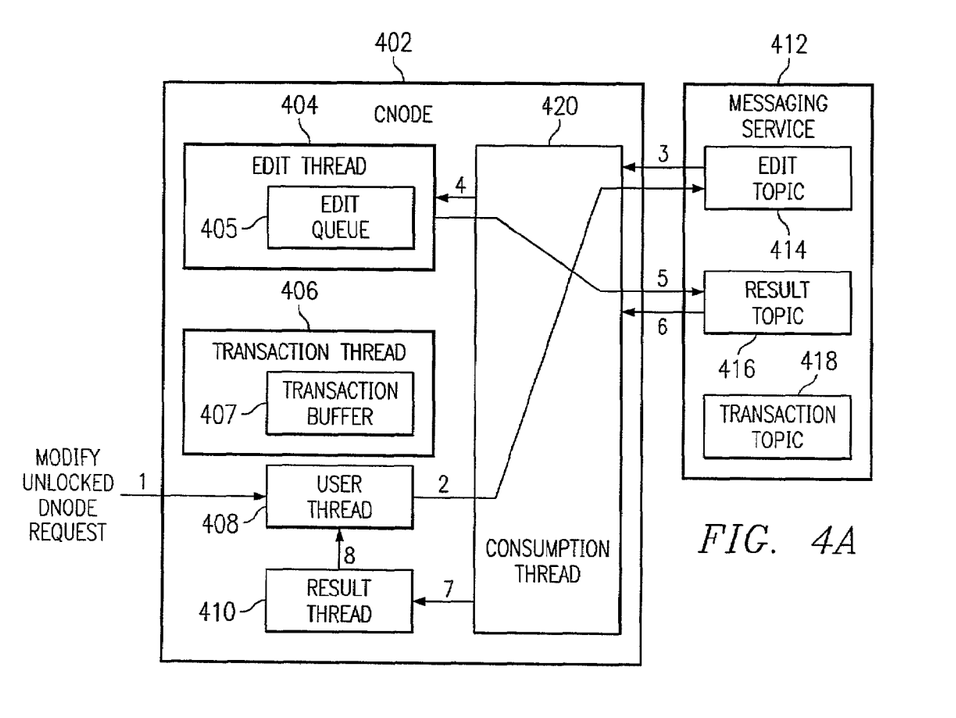
FIGS. 4A–4D are block diagrams depicting data flow between a cluster node and a messaging service in accordance with a preferred embodiment of the present invention.

Particularly, with reference to FIG. 4A, a data flow diagram is shown illustrating the processing of an unlocked Dnode modification request. Cnode 402 processes a request to modify an unlocked Dnode as described by the following steps:

1. The user thread receives a request to modify an unlocked Dnode.
2. The user thread publishes a work item message to the edit topic.
3. The topic consumption thread consumes the work item message from edit topic 414.
4. The consumption thread dispatches the work item message to the edit thread for processing. The edit thread receives the work item message and places the work item message in the edit queue.
5. When the work item message becomes the top item in the edit queue, the Cnode whose brand is affixed to that work item message processes the work item message in the edit queue and publishes an edit result item in the result topic.
6. The topic consumer thread consumes the edit result item.
7. The edit result item is dispatched to the result thread.
8. If the brand affixed to the result item is that of the current Cnode, the user thread referenced in the result item is interrupted with a response, and the changes are committed to secondary storage. The result threads of all Cnodes remove the corresponding work item message from their edit queue and commit the modification to their DOM in memory.

Events on unlocked Dnodes from multiple sources must be executed in the order received. Publishing them to the edit topic accomplishes this ordering and all Cnodes execute items with their own brand in their edit queue as those rise to the top of the edit queue. When the result thread receives an edit result item for an unlocked Dnode with the brand of another Cnode, then the result thread commits the modification and removes the work item message from the edit queue.

Figure 4B:
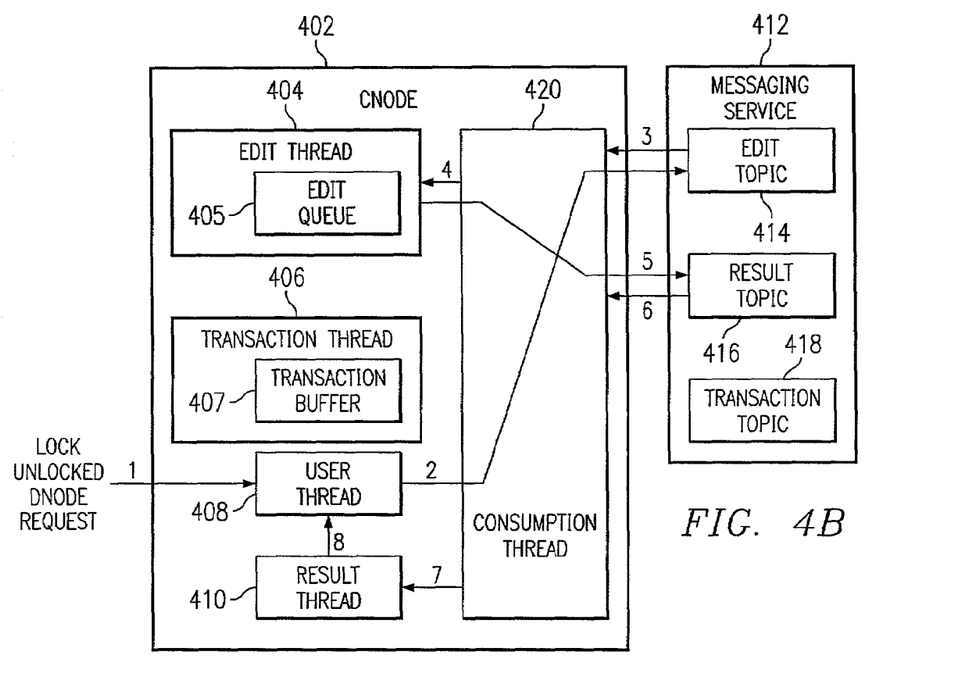

Turning now to FIG. 4B, a data flow diagram is shown illustrating the processing of a Dnode lock request. Cnode 402 processes a request to lock a Dnode as described by the following steps:

1. The user thread receives a request to lock an unlocked Dnode.
2. The user thread publishes a work item message to the edit topic.
3. The topic consumption thread consumes the work item message.

4. The consumption thread hands the work item message to the edit thread which places the work item message in the edit queue.
5. The edit thread processes the work item message in the edit queue and publishes a lock result item in the result topic. If the node is already locked the request is rejected and the success flag in the result item indicates an unsuccessful result.
6. The topic consumer thread consumes the lock result item.
7. The consumption thread hands the lock result item to the result thread. If the brand affixed to the result item is that of the current Cnode, the user thread referenced in the result item is interrupted with a response. There is no change in any secondary storage item during a lock.
8. The result thread commits the lock of the subtree in the DOM. The locking Cnodes makes a copy of the newly locked Dnode and assigns it to its transaction buffer. All Cnodes record the lock. Along with a reference to the locked data (the root node of the locked subtree, in the preferred embodiment), the locking facility employed by the Cnodes must record the Locking Cnode's ID and the Session ID of the locking session.

Since a lock operation is executed against an unlocked Dnode, the execution of the work item message must be synchronized to avoid later edit requests from modifying the Dnode before it is locked. The execution of lock requests and requests that modify unlocked Dnodes are processed on a first-in-first-out (FIFO) basis and synchronized by the edit queue.

Figure 4C:
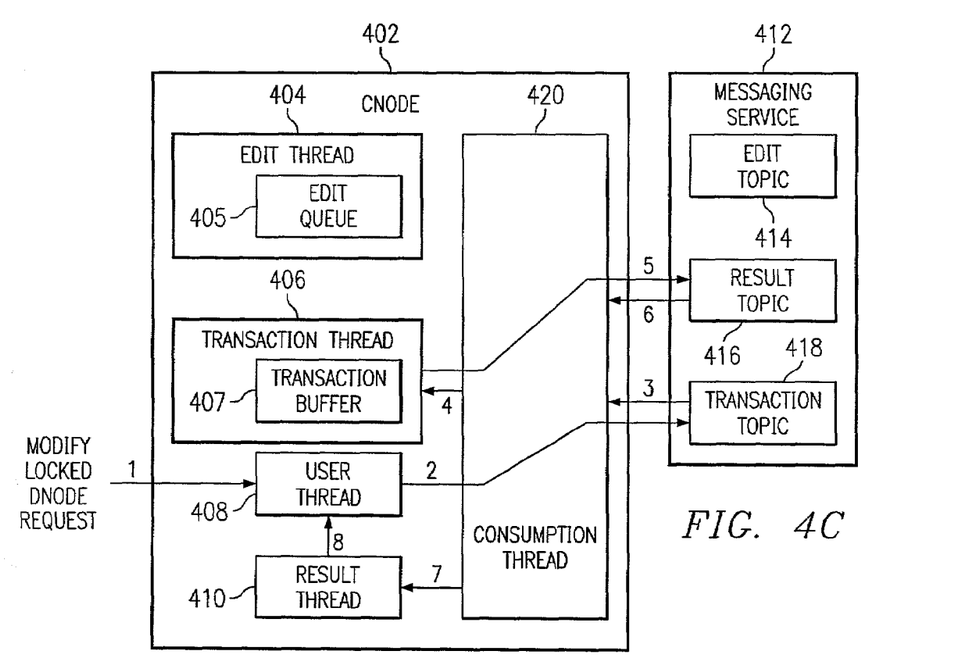

With reference now to FIG. 4C, a data flow diagram is shown illustrating the processing of a locked Dnode modification request. Cnode 402 processes a request to modify a locked Dnode as described by the following steps:
1. The user thread receives a request to modify a locked Dnode.
2. The user thread publishes a work item message to the transaction topic and assigns the locking Cnode's ID as a filter value.
3. The consumption thread of the locking Cnode consumes the work item message from the transaction topic.
4. The consumption thread dispatches the work item message to the transaction thread.
5. The transaction thread processes the work item message against the cloned Dnode in the transaction buffer. Next, the transaction thread publishes a transaction result item to the result topic, with a task type of "Response".
6. The consumption thread consumes the transaction result item.
7. The consumption thread dispatches the transaction result item to the result thread.
8. The Result thread interrupts the user thread with a response.

Modify or unlock requests on locked Dnodes are restricted to the locking session. This single source of modifications accomplishes the ordered execution achieved for unlocked Dnodes via the edit queue. By treating events for locked and unlocked Dnodes differently, edit topic events are synchronized and transaction topic events can execute without regard to time or timing. This improves throughput, because transaction topic events do not have to wait for any other event to execute.

Figure 4D:
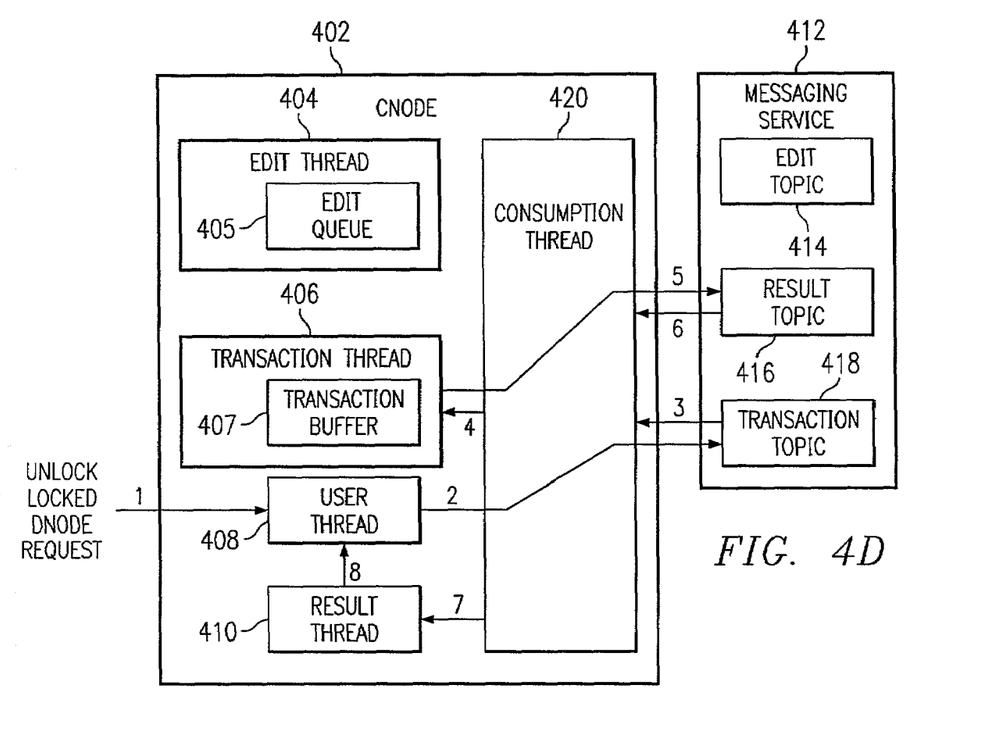

With reference to FIG. 4D, a data flow diagram is shown illustrating the processing of a Dnode unlock request. Cnode 402 processes a request to unlock a locked Dnode as described by the following steps:

1. The user thread receives a request to unlock a locked Dnode.
2. If the request comes from the locking session, the user thread publishes a work item message to the transaction topic and assigns the locking Cnode's ID as a filter value. If the request is not from the locking session, then the request is denied and an error is generated.
3. The consumption thread of the locking Cnode consumes the work item message in the transaction topic.
4. The consumption thread hands the work item message to the transaction thread.
5. The transaction thread publishes to the result topic a result item for the unlock request, with a filter set to 'all', that includes the Dnode (DOM subtree) from its transaction buffer that is associated with the unlock request.
6. The consumption thread consumes the transaction result item containing the modified DOM subtree.
7. The consumption thread hands the transaction result item to the result thread.
8. If the brand is that of the current Cnode, the result thread commits all the modifications to secondary storage. All result threads perform the modification update to their DOM in memory. If the brand is that of the current Cnode, the result thread interrupts the associated user thread with a response. The result threads of all Cnodes unlock the associated Dnode.

In an alternative embodiment, the DOM subtree may be streamed and a copy added to the transmitting message. The transaction thread then publishes the unlock result to the result topic, with the filter set to 'all', as a separate message. The consumption thread then consumes the result item for the unlock request as a separate message. If the brand is that of the current Cnode, the result thread interrupts the associated user thread with a response. The result threads of all Cnodes unlock the associated Dnode.

Figure 5:
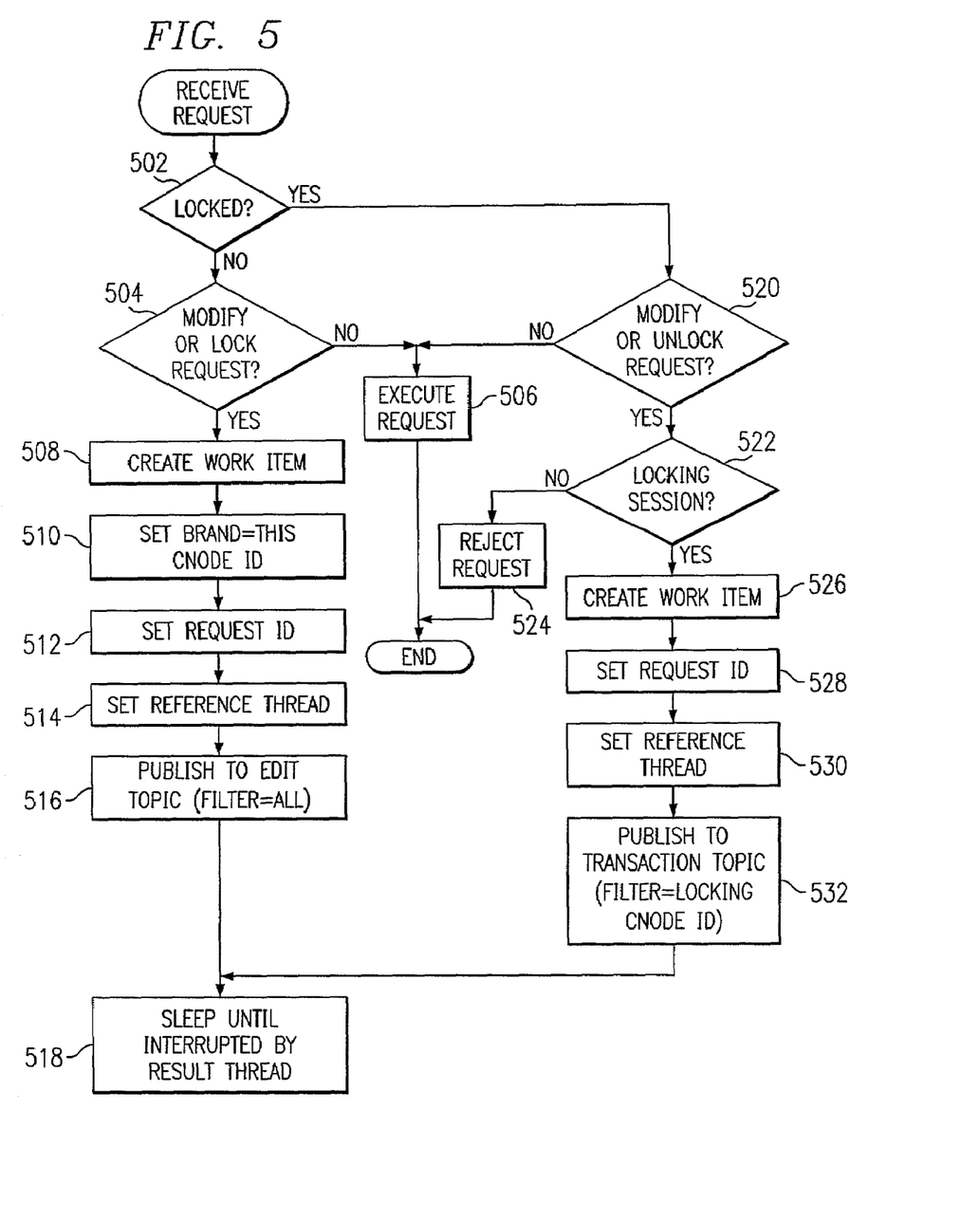
FIG. 5 is a flowchart illustrating the operation of a user thread in accordance with a preferred embodiment of the present invention.

With reference now to FIG. 5, a flowchart illustrating the operation of a user thread is shown in accordance with a preferred embodiment of the present invention. The process begins when a user request to read, lock, unlock, or modify a Dnode is received. A user thread is created for each request. A determination is made as to whether the Dnode is locked (step 502). If the Dnode is not locked, a determination is made as to whether the request is a modify or lock request (step 504). If the request is not a modify or lock request, the process executes the request (step 506), and ends.

If the request is a modify or lock request in step 504, the process creates a work item message (step 508), sets the brand to be equal to the Cnode ID (step 510), and sets the request ID (step 512). The request ID allows items in the edit queue to be matched with result items. When a result item is consumed—and the task is therefore complete—the result thread looks up the work item message in the edit queue and removes it. Next, the process sets the reference thread (step 514) and publishes the work item message the edit topic with the filter set to all Cnodes (step 516). The reference thread is the ID for the user thread that initiated a request. This allows the result thread for the originating Cnode to find the correct user thread to 'wake up' and respond to. Thereafter, the user thread process sleeps until interrupted by the result thread (step 518).

If the Dnode is locked in step 502, a determination is made as to whether the request is a modify or unlock request (step 520). If the request is not a modify or unlock request, the process executes the request (step 506) and ends. If the request is a modify or unlock of a locked Dnode request, a determination is made as to whether the requester's HTTP session is the locking session for the Dnode (step 522). If the session associated with the request is not the locking session, the process rejects the request (step 524) and ends.

If the session is the locking session in step 522, the process creates a work item message (step 526), sets the request ID (step 528), and sets the reference thread (step 530). Then, the process publishes the work item message to the transaction topic with the filter set to the locking Cnode ID (step 532) and proceeds to step 518 to sleep until interrupted by the result thread.

Figure 6:
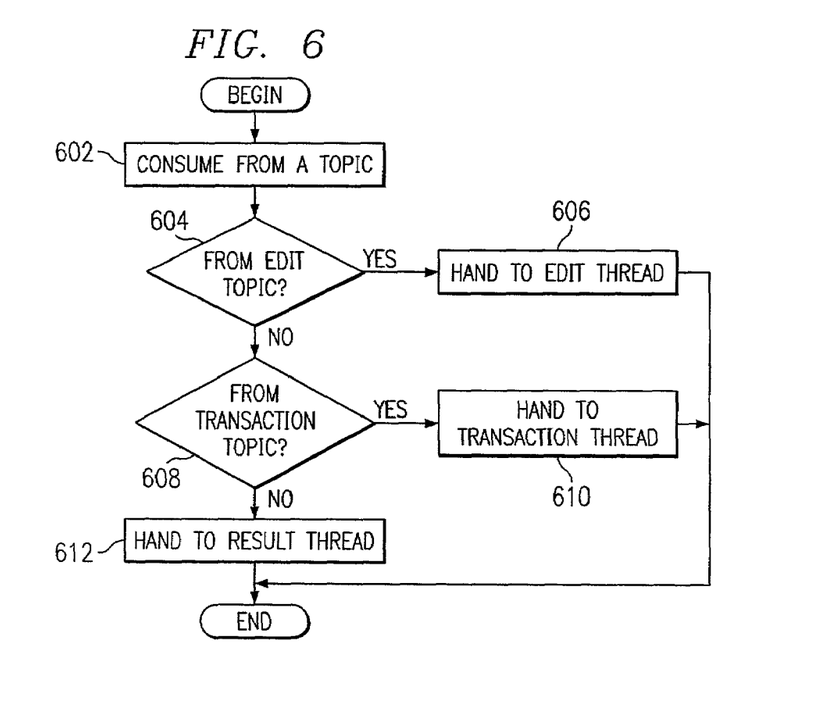
FIG. 6 is a flowchart depicting the operation of a topic consumer thread in accordance with a preferred embodiment of the present invention.

Turning now to FIG. 6, a flowchart is shown depicting the operation of a topic consumer thread in accordance with a preferred embodiment of the present invention. The process begins and consumes a work item message from a topic (step 602). A determination is made as to whether the topic is the edit topic (step 604). If the topic is the edit topic, the process hands the work item message to the edit thread (step 606) and ends.

If the topic is not the edit topic in step 602, a determination is made as to whether the topic is the transaction topic (step 608). If the topic is the transaction topic, the process hands the work item message the transaction thread (step 610) and ends. If the topic is not the transaction topic in step 608, then the topic is the result topic and the process hands the work item message to the result thread (step 612) and ends.

Figure 7:
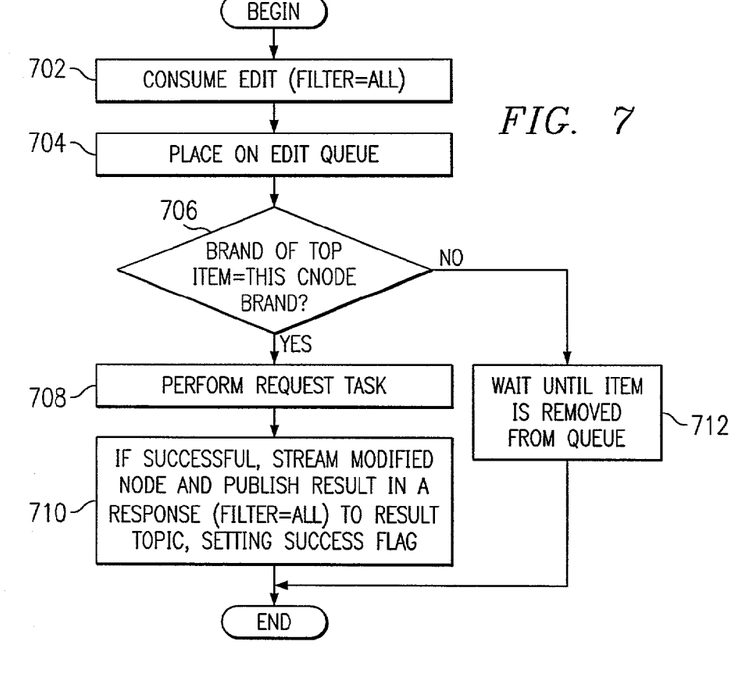
FIG. 7 is a flowchart illustrating the operation of an edit thread in accordance with a preferred embodiment of the present invention.

With reference to FIG. 7, a flowchart is shown illustrating the operation of an edit thread in accordance with a preferred embodiment of the present invention. The process begins and consumes a work item message from the edit topic (step 702). All work item messages in the edit topic have the filter set to "All." Next, the process places the work item message on the edit queue (step 704) and a determination is made as to whether the top work item message in the edit queue has a brand equal to the ID of the Cnode (step 706).

If the brand is equal to the ID of the Cnode, the process performs the requested task (step 708). The requested task may be performed directly against the data on that Cnode, or against a clone of the data. If the first approach is taken, the result thread does not update the data on the Cnode whose brand is associated with that work item message. If the second approach is taken, then the result thread performs the update in the same manner as all other Cnodes in the cluster.

If the task is successful, the process streams the modified node and publishes the result in a response to the result topic with the filter set to all Cnodes and the success flag set (step 710). Thereafter the process ends. If the brand is not equal to the ID of the Cnode in step 706, the process waits until the item is removed from the queue (step 712) and ends. The item is removed from the queue by the result thread in response to an edit result from the appropriate Cnode.

Whenever an item is removed from the edit queue, the Edit Thread is asked to check the edit queue (step 706) to determine if the new work item message at the top of the queue has a brand equal to the ID of the current Cnode. The behavior of the Edit Thread then proceeds as described in the remaining steps of FIG. 7.

Figure 8:
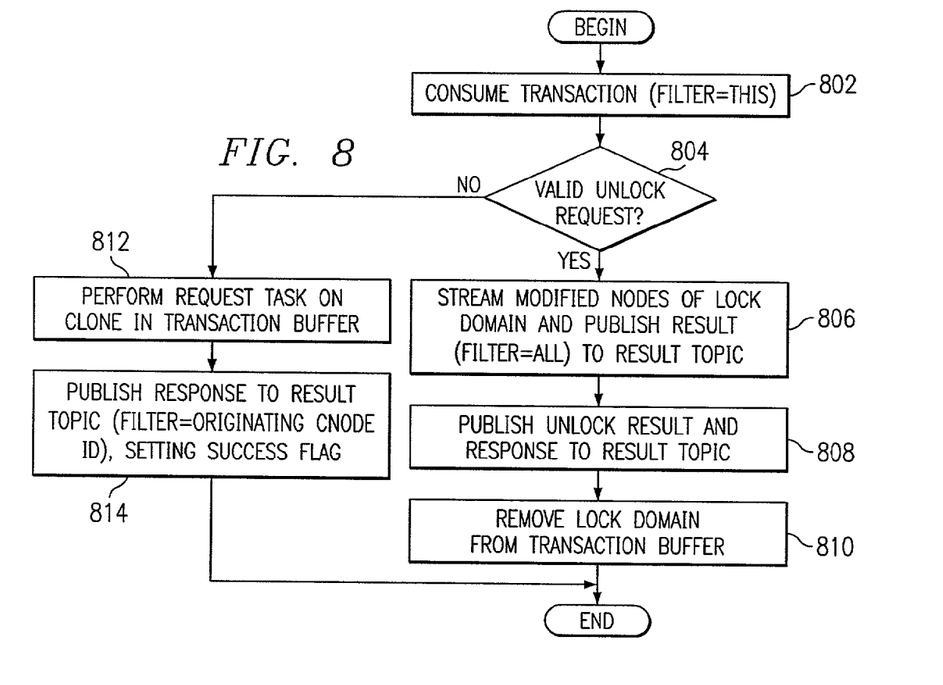
FIG. 8 is a flowchart depicting the operation of a transaction thread in accordance with a preferred embodiment of the present invention.

Turning now to FIG. 8, a flowchart depicting the operation of a transaction thread is illustrated in accordance with a preferred embodiment of the present invention. The process begins and consumes a work item message from the transaction topic (step 802). Work item messages in the transaction topic are branded with the ID of the locking Cnode; therefore, the transaction thread consumes work item messages branded with its Cnode ID only. A determination is made as to whether the request is a valid unlock request (step 804).

If the request is a valid unlock request, the process streams the modified nodes of the lock domain, present in the transaction buffer of the current Cnode, and publishes the result to the result topic with the filter set to "All" (step 806). Then, the process publishes an unlock result and response to the result topic (step 808), removes the lock domain from the transaction buffer (step 810), and ends. If the request is not a valid unlock request in step 804, the process performs the requested task on a clone of the Dnode in the transaction buffer (step 812), publishes a response to the result topic with the filter equal to the originating Cnode ID and the success flag set (step 814), and ends.

Figure 9:
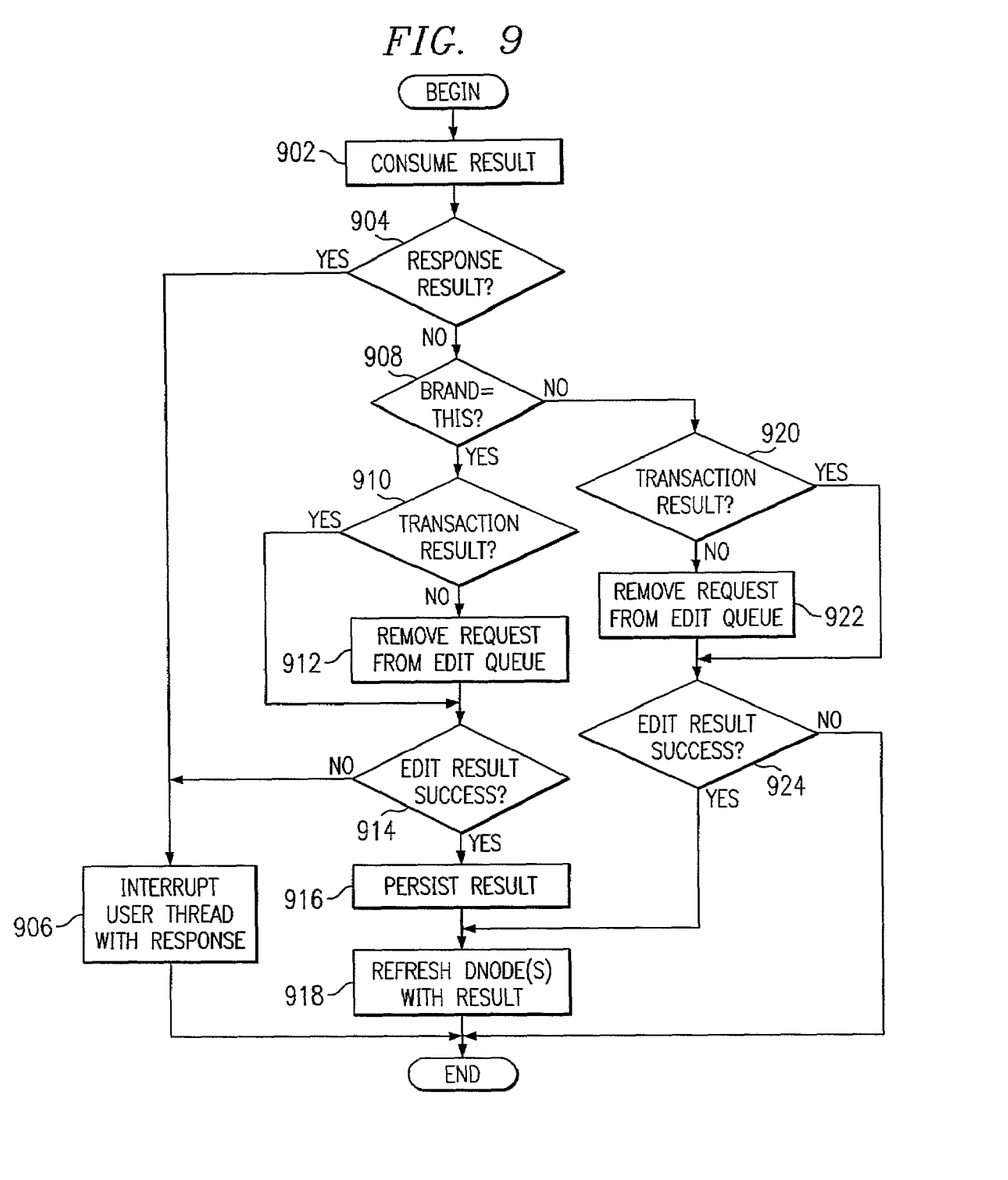
FIG. 9 is a flowchart illustrating the operation of a result thread in accordance with a preferred embodiment of the present invention.

With reference now to FIG. 9, a flowchart is shown illustrating the operation of a result thread in accordance with a preferred embodiment of the present invention. The process begins and consumes a result from the result topic (step 902). A determination is made as to whether the result is a response result (step 904). If the result is a response result, the process interrupts the user thread with the response (step 906) and ends.

If the result is not a response result in step 904, a determination is made as to whether the brand of the result is equal to the ID of the Cnode (step 908). If the brand is equal to the ID of the Cnode, a determination is made as to whether the result is a transaction result (step 910). If the result is not a transaction result, then it is an Edit Result, and the process removes the request from the edit queue (step 912). For either type of result, a determination is then made as to whether the result is marked as a success (step 914).

If the result is not marked as a success, the process interrupts the user thread with the response (step 906) and ends. If the result is marked as a success in step 914, the process interrupts the user thread with the response, persists the result to secondary storage (step 916), refreshes the Dnode with the result (step 918), and ends. Thus, the permanent copy of the DOM is only updated by the Cnode making the modification.

If the brand is not equal to the ID of the Cnode in step 908, a determination is made as to whether the result is a transaction result (step 920). If the result is a transaction result, the process proceeds to step 924 to determine if the result is a success. If the result is a success, the process refreshes the Dnode (step 918) with the result, and ends. Thus, every Cnode updates its copy of the DOM in memory. If the result is not a success, the process ends.

If the result is not a transaction result in step 920, then it is an Edit Result, and the process removes the request from the edit queue (step 922) and a determination is made as to whether the result is marked as a success (step 924). If the result is marked as a success, the process refreshes the Dnode with the result (step 918), and ends. If the result is not marked a success, the process ends.

Thus, the present invention solves the disadvantages of the prior art by providing a message based data sharing model. By separating requests for locked and unlocked Dnodes, the requests may be treated differently. All non-transaction requests are filtered through the edit topic and thereby ordered. Transaction requests need not wait for queued requests to be executed, thereby speeding up execution times. Transaction requests are consumed only by the originating Cnode, thereby reducing message traffic. The present invention readily supports locking, transactions, and rollback.

Rollbacks are possible because transactions only modify cloned data in the transaction buffer. If any part of a transaction is not successful, the modified data in the transaction buffer can be purged from memory, leaving the original data untouched. All modifications in a transaction are persisted as a unit; thus, the number of persistence writes to alternate storage is reduced. By first executing the event, the validity of the event can be ascertained and the results can be provided to the remaining nodes in the cluster without each node having to perform the same work. The performance savings for authorization may be particularly important.

The data sharing model of the present invention also does not use a master/slave relationship within the cluster, thus eliminating errors resulting from such an arrangement. The cluster operates asynchronously where possible but maintains the synchronous order of request execution where needed. Secondary storage and all cluster nodes are updated simultaneously, reducing the opportunity for data loss to an insignificant level. No committed data can be lost.

Java Messaging Service provides scalability. An application built around a messaging architecture scales well as both clients and servers are added to the system. An application will also scale well as the number of messages increases. Cluster size is limited only by limits to the number of topic consumers. Although unlikely, if the number of allowed topic consumers is insufficient, messages may be published to backup sets of edit and transaction topics and the consumers may be partitioned between the two topic sets. Java Messaging Service also masks both heterogeneity and change. The common element in a messaging application is the message. As long as components can read and understand the messages, the platform on which they reside and the languages in which they are written are unimportant.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing shared data comprising:
   receiving a request to perform a task on shared data;
   creating a work item message for the task; and
   publishing the work item message to a messaging service by posting the work item message to a topic of the messaging service based on a type of the task, wherein the topic is a category by which messages in the messaging service are sorted, wherein the type of the task is one of an edit task for modifying an unlocked node and a locking task for locking an unlocked node, wherein posting the work item message to a topic comprises posting the work item message to an edit topic with a filter value set to all nodes, wherein the edit topic is a category identifying non-transaction requests for unlocked nodes.

2. A computer implemented method for processing shared data comprising:
   receiving a request to perform a task on shared data;
   creating a work item message for the task; and
   publishing the work item message to a messaging service by posting the work item message to a topic of the messaging service based on a type of the task, wherein the topic is a category by which messages in the messaging service are sorted, wherein the type of the task is one of an edit task for modifying a locked node and an unlocking task for unlocking a locked node, wherein posting the work item message to a topic comprises posting the work item message to a transaction topic with a filter value set to a node originating the request, wherein the transaction topic is a category identifying transaction requests for locked nodes.

3. A computer implemented method for processing shared data comprising:
   receiving a work item message from a messaging service by consuming the work item message from a topic of the messaging service, wherein the topic is a category by which messages in the messaging service are sorted;
   processing the work item message based on the topic;
   publishing a result to a result topic of the messaging service, wherein the result topic is a category identifying results of processing the work item message; and
   wherein consuming the work item message from a topic comprises consuming the work item message from an edit topic, wherein the edit topic is a category identifying non-transaction requests for unlocked nodes, and wherein the work item message consumed from the edit topic has a filter value set to all nodes.

4. The computer implemented method of claim 3, further comprising placing the work item message in an edit queue, wherein the edit queue comprises a plurality of work item messages received from the messaging service.

5. The computer implemented method of claim 4, wherein processing the work item message comprises:
   determining whether the work item message was created by a current server cluster node based on the filter value; and
   performing a request task corresponding to the work item message if the work item message was created by the current server cluster node.

6. The computer implemented method of claim 5, wherein processing the work item message further comprises:
   waiting until the work item message is removed from the edit queue if the work item message was not created by the current server cluster node.

7. The computer implemented method of claim 3, wherein the work item message comprises a locking request for locking an unlocked node.

8. The computer implemented method of claim 7, wherein processing the work item message comprises locking a portion of shared data.

9. A computer implemented method for processing shared data comprising:
   receiving a work item message from a messaging service by consuming the work item message from a topic of the messaging service, wherein the topic is a category by which messages in the messaging service are sorted;

processing the work item message based on the topic;
publishing a result to a result topic of the messaging service, wherein the result topic is a category identifying results of processing the work item message; and
wherein consuming the work item message from a topic comprises consuming the work item message from a transaction topic, wherein the transaction topic is a category identifying transaction requests for locked nodes, and wherein the work item message consumed from the transaction topic has a filter value set to an identifier of a locking node.

10. The computer implemented method of claim 9, wherein processing the work item message comprises:
performing a request task corresponding to the work item message on a clone of at least a portion of shared data.

11. The computer implemented method of claim 9, wherein the work item message comprises an unlocking request for unlocking a locked node.

12. The computer implemented method of claim 11, wherein processing the work item message comprises unlocking at least a portion of shared data.

13. The computer implemented method of claim 12, wherein the result comprises a modified portion of the shared data.

14. A data processing system for processing shared data comprising:
a bus,
a storage device, wherein the storage device contains computer usable code;
a communications unit connected to the bus; and
a processing unit connected to the bus, wherein the processing unit executes the computer usable code to receive a request to perform a task on shared data;
create a work item message for the task; and
publish the work item message to a messaging service by posting the work item message to a topic of the messaging service based on a type of the task, wherein the topic is a category by which messages in the messaging service are sorted, and wherein the type of the task is one of an edit task for modifying an unlocked node and a locking task for locking an unlocked nodes wherein the processing unit, in executing the computer usable code to post the work item message to a topic of the messaging service based on a type of the task, executes the computer usable code to post the work item message to an edit topic with a filter value set to all nodes, wherein the edit topic is a category identifying non-transaction requests for unlocked nodes.

15. A data processing system for processing shared data comprising:
a bus,
a storage device, wherein the storage device contains computer usable code;
a communications unit connected to the bus; and
a processing unit connected to the bus, wherein the processing unit executes the computer usable code to receive a request to perform a task on shared data;
create a work item message for the task; and
publish the work item message to a messaging service by posting the work item message to a topic of the messaging service based on a type of the task, wherein the topic is a category by which messages in the messaging service are sorted, and wherein the type of the task is one of an edit task for modifying a locked node and an unlocking task for unlocking a locked node, wherein the processing unit, in executing the computer usable code to publish the work item message to a messaging service by posting the work item message to a topic of the messaging service based on a type of the task, executes the computer usable code to post the work item message to a transaction topic with a filter value set to a node originating the request, wherein the transaction topic is a category identifying transaction requests for locked nodes.

16. A data processing system for processing shared data comprising:
a bus,
a storage device, wherein the storage device contains computer usable code;
a communications unit connected to the bus; and
a processing unit connected to the bus, wherein the processing unit executes the computer usable code to receive a work item message from a messaging service by consuming the work item message from a topic of the messaging service, wherein the topic is a category by which messages in the messaging service are sorted;
process the work item message based on the topic;
publish a result to a result topic of the messaging service, wherein the result topic is a category identifying results of processing the work item message; and
wherein the processing unit, in executing the computer usable code to receive a work item message from a messaging service by consuming the work item message from a topic of the messaging service, executes the computer usable code to consume a work item message from an edit topic, wherein the edit topic is a category identifying non-transaction requests for unlocked nodes, and wherein the work item message consumed from the edit topic has a filter value set to all nodes.

17. The data processing system of claim 16, wherein the processing unit further executes the computer usable code to place the work item message in an edit queue, wherein the edit queue comprises a plurality of work item messages received from the massaging service.

18. The data processing system of claim 17, wherein the processing unit, in executing the computer usable code to process the work item message based on the topic, executes the computer usable code to determine whether the work item message was created by a current server cluster node based on the filter value; and
perform a request task corresponding to the work item message if the work item message was created by the current server cluster node.

19. The data processing system of claim 18, wherein the processing unit, in executing the computer usable code to process the work item message based on the topic, executes the computer usable code to wait until the work item message is removed from the edit queue if the work item message was not created by the current server cluster node.

20. The data processing system of claim 16, wherein the work item message comprises a locking request for locking an unlocked node.

21. The data processing system of claim 20, wherein the processing unit, in executing the computer usable code to process the work item message based on the topic, executes the computer usable code to lock a portion of shared data.

22. A data processing system for processing shared data comprising:
a bus,
a storage device, wherein the storage device contains computer usable code;
a communications unit connected to the bus; and
a processing unit connected to the bus, wherein the processing unit executes the computer usable code to receive a work item message from a messaging service by consuming the work item message from a topic of the messaging service, wherein the topic is a category by which messages in the messaging service are sorted;

process the work item message based on the topic;

publish a result to a result topic of the messaging service, wherein the result topic is a category identifying results of processing the work item message; and wherein the processing unit, in executing the computer usable code to receive a work item message from a messaging service by consuming the work item message from a topic of the messaging service, executes the computer usable code to consume a work item message from a transaction topic, wherein the transaction topic is a category identifying transaction requests for locked nodes, and wherein the work item message consumed from the transaction topic has a filter value set to an identifier of a locking node.

23. The data processing system of claim 22, wherein the processing unit, in executing the computer usable code to process the work item message based on the topic, executes the computer usable code to perform a request task corresponding to the work item message on a clone of at least a portion of shared data.

24. The data processing system of claim 22, wherein the work item message comprises an unlocking request for unlocking a locked node.

25. The data processing system of claim 24, wherein the processing unit, in executing the computer usable code to process the work item message based on the topic, executes the computer usable code to unlock at least a portion of shared data.

26. The data processing system of claim 25, wherein the result comprises a modified portion of the shared data.

27. A computer program product for processing shared data, the computer program product comprising:

a computer usable storage medium having computer usable program code embodied therein, the computer useable program code comprising:

computer usable program code configured to receive a work item message from a messaging service by consuming the work item message from a topic of the messaging service, wherein the topic is a category by which messages in the messaging service are sorted and consuming the work item message from a topic comprises consuming the work item message from an edit topic, wherein the edit topic is a category identifying non-transaction requests for unlocked nodes, and wherein the work item message consumed from the edit topic has a filter value set to all nodes;

computer usable program code configured to process the work item message based on the topic; and computer usable program code configured to publish a result to a result topic of the messaging service, wherein the result topic is a category identifying results of processing the work item message.

* * * * *